(12) United States Patent
Rekimoto et al.

(10) Patent No.: US 7,088,342 B2
(45) Date of Patent: Aug. 8, 2006

(54) INPUT METHOD AND INPUT DEVICE

(75) Inventors: Junichi Rekimoto, Tokyo (JP);
Tatsushi Nashida, Kanagawa (JP);
Ivan Poupyrev, Tokyo (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 10/437,797

(22) Filed: May 14, 2003

(65) Prior Publication Data

US 2003/0234768 A1    Dec. 25, 2003

(30) Foreign Application Priority Data

May 16, 2002    (JP)    ............................. 2002-141742

(51) Int. Cl.
*G09G 5/00*    (2006.01)
(52) U.S. Cl. ...................... 345/169; 345/173
(58) Field of Classification Search ................ 345/156, 345/157, 168, 169, 173, 176, 179, 160, 162, 345/172, 705, 773; 178/18.01, 18.02, 19.01, 178/19.02; 715/771, 773, 705
See application file for complete search history.

(56) References Cited

U.S. PATENT DOCUMENTS

| | | | | |
|---|---|---|---|---|
| 5,543,588 A | * | 8/1996 | Bisset et al. | ............. 178/18.06 |
| 5,729,219 A | * | 3/1998 | Armstrong et al. | ........... 341/20 |
| 6,023,265 A | * | 2/2000 | Lee | ............................ 345/173 |
| 6,747,635 B1 | * | 6/2004 | Ossia | ......................... 345/169 |
| 6,909,424 B1 | * | 6/2005 | Liebenow et al. | .......... 345/169 |
| 2002/0149561 A1 | * | 10/2002 | Fukumoto et al. | .......... 345/156 |
| 2003/0184528 A1 | * | 10/2003 | Kawasaki et al. | .......... 345/173 |

\* cited by examiner

*Primary Examiner*—Bipin Shalwala
*Assistant Examiner*—Nitin Patel
(74) *Attorney, Agent, or Firm*—Finnegan, Henderson, Farabow, Garrett & Dunner, L.L.P.

(57) ABSTRACT

A display panel disposed on the front surface of a device shows information related to an operation input. A sensor for detecting a touch of an object is disposed on the back surface of the device. A mark representing the touch position is displayed at a position directly above the position of a touch detected by the sensor on the display panel. When the mark representing the touch position and the display position of the information are overlapped, an input process corresponding to the overlapped information is performed.

6 Claims, 11 Drawing Sheets

INPUT METHOD AND INPUT DEVICE

BACKGROUND OF THE INVENTION

1. Field of the Invention

The present invention relates to input methods and input devices suited for operating, for example, portable electronic apparatuses.

2. Description of the Related Art

It is difficult to provide a keyboard with portable electronic apparatuses, such as PDAs (Personal Digital Assistants), compared to typical computers. Input devices, such as touch panels, are therefore constructed to realize various inputs by touching a panel with an object, such as a finger and a special pen.

The touch panel is formed on the display panel, such as a liquid crystal display panel, where operation buttons, a keyboard, and the like are displayed. When one of the buttons or a key on the keyboard is touched, even though the touch panel has relatively a small area, a complicated input process can be realized by assigning a function to the corresponding button or key.

However, known touch panels are constructed to accept an input via direct contact on the front surface of the display panel with the object. This causes a variety of problems. For example, touching the display panel directly to operate it may smudge the front surface of the display panel. The smudges become worse, making characters and graphics on the display panel hard to recognize. This requires occasional cleaning of the front surface of the display panel with a cloth or the like.

In addition, when touching the display panel with the finger to operate it, the sizes of the operation buttons shown on the display panel should not be less than the width of the finger. To be specific, a touch panel in which a plurality of operation buttons is aligned with a pitch narrower than the width of a finger to operate it by touching the display position of a desired operation button has been constructed. When using this touch panel, however, the user may accidentally touch several buttons simultaneously or may cover the entirety of one operation button with his/her finger. Hence, the user cannot easily recognize which operation button corresponds to the position being touched with the finger. This reduces the operability of the touch panel.

SUMMARY OF THE INVENTION

Accordingly, it is an object of the present invention to enable the input operation of a touch-sensitive input device, such as a touch panel, to be easily and reliably performed.

To this end, according to a first aspect of the present invention, there is provided an input method including an operation-input display step of displaying information related to an operation input at a display position, a detecting step of detecting a touch of an object at a touch position on a first surface behind the information displayed at the operation input display step, a touch-position display step of displaying a mark at a mark position directly above the touch position, the mark representing the touch position, and an input step of determining whether the display position of the information displayed at the operation-input display step and the mark position of the mark displayed at the touch-position display step are overlapped, and when overlapping is determined, executing an input process corresponding to the overlapped information.

According to a second aspect of the present invention, an input device includes a display panel disposed on the front surface of a casing, a back-surface sensor for detecting a touch of an object at a touch position on the back surface of the casing, and a control unit for displaying information related to an operation input on the display panel, displaying a mark representing the touch position at the corresponding position of the display panel directly above the touch position detected by the back-surface sensor, determining whether the display position of the information and the position of the mark are overlapped, and when overlapping is determined, executing an input process corresponding to the overlapped information.

A finger or the like touches the back surface of a device with a display on the display panel on the front surface of the device being observed. A mark is displayed on the display panel at the position on the display panel directly above the touch position of the finger. When the position of the mark, that is, the touch position on the back surface and the display position of information related to the operation input shown on the display panel, for example, operation buttons, are overlapped, an input process is performed. Therefore, without touching the front surface, the same operations as those of known touch panels are realized. In addition, since there is no need to touch the front surface during the operation, no smudge on the display panel occurs, and characters and graphics on the display panel are not covered with the touched finger. Accordingly, a user can perform reliable input operations because the display on the display panel can be easily recognized. Even when the operation buttons are aligned with a pitch narrower than the width of a finger, a desired button is reliably operated by causing, for example, the center of the mark representing the touch position to be overlapped with the display position of the desired button. This improves the operability of the touch panel.

The back-surface sensor may detect an approach of the object to an approach position on the back surface of the casing, and the control unit may display a mark representing the approach position detected by the back-surface sensor on the corresponding position of the display panel.

In this case, the sensor also detects an approach of the object to the back surface of the casing. The mark representing the approach position detected by the sensor is displayed at the corresponding position on the display panel. For example, a position on the display panel the finger approaches may be displayed even though the finger does not completely touch the back surface. Accordingly, the user can notice a position to be touched before the user actually touches the back surface to operate the device.

The input device may further include a front-surface sensor for detecting a touch on the front surface of the display panel. In the input device, the control unit performs a predetermined input process corresponding to the touch position detected by the front-surface sensor.

Aside from the back surface sensor, the front surface sensor is disposed on the front surface of the display panel. By performing an input process corresponding to the touch position detected by the front surface sensor and the back surface sensor, the disposition of the sensors on both surfaces of the device can realize an advanced input process.

In the input device, when one of the back-surface sensor and the front-surface sensor performs touch detection, the control unit may perform an input process of selecting an input item, and when the other performs touch detection, the control unit may perform an input process of adjusting a value related to the selected input item.

For example, when one of the back-surface sensor and the front-surface sensor performs touch detection, the input item is selected; and when the other performs touch detection, the parameter related to the selected input item is input. This realizes a selection among a plurality of items and a detailed adjustment of the selected item.

The input device may further include an actuator for temporarily vibrating the casing provided with the display panel. In the input device, the control unit may control vibrations of the actuator in accordance with a touch-detection state obtained by the back-surface sensor.

By providing the actuator that temporarily vibrates the casing mounted on the display panel, vibrations of the actuator is controlled in accordance with a touch detection state of the sensor. For example, when some input process is executed in response to a touch on the back surface of the device, the actuator temporarily vibrates the device to be able to let the user notice that input is performed. This improves the operability of the system.

DESCRIPTION OF THE PREFERRED EMBODIMENTS

Figure 1:
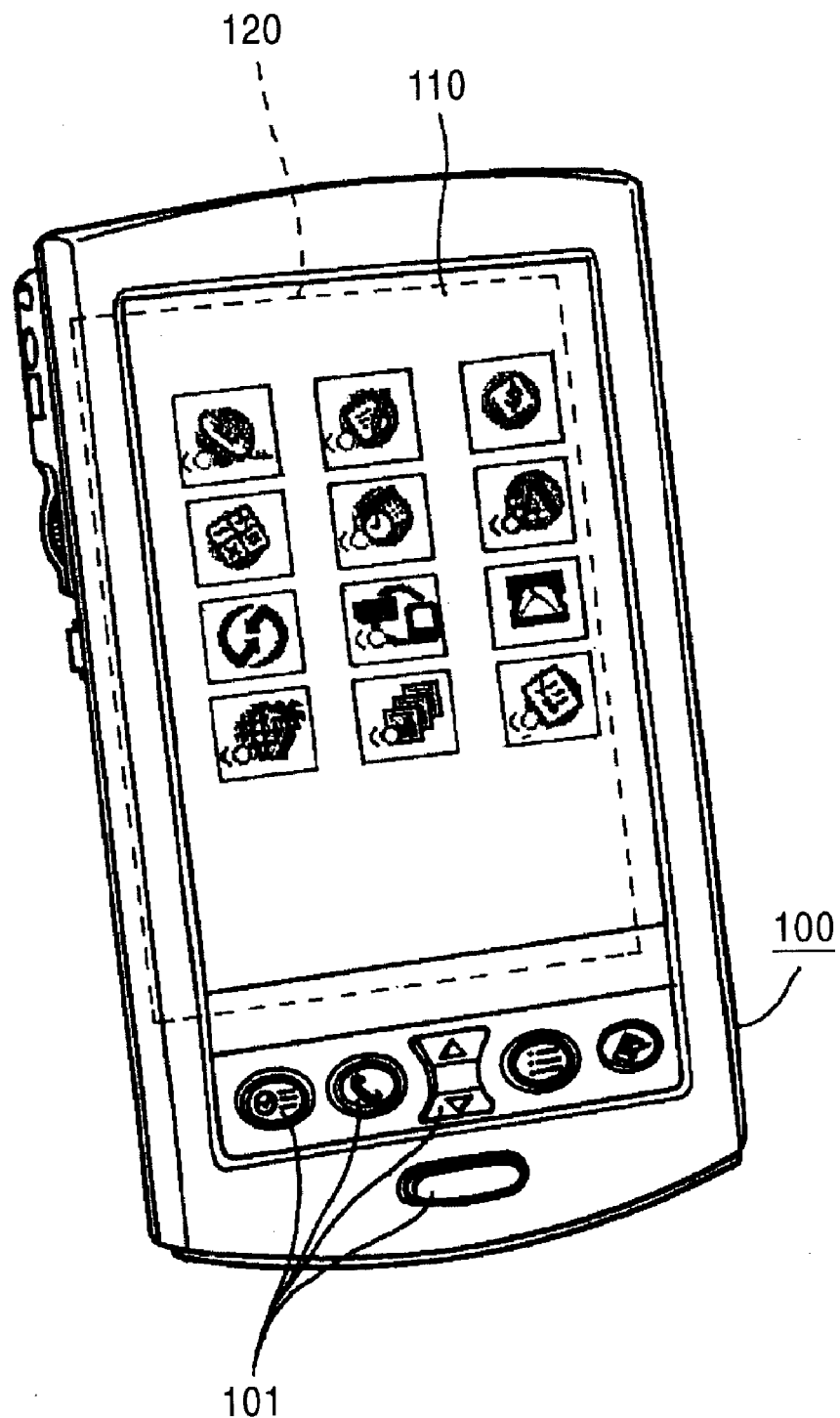
FIG. 1 is a perspective view showing an example construction of an apparatus (PDA) provided with an input device according to one embodiment of the present invention.

FIG. 1 shows a perspective view of an input device according to the present invention applied to a PDA 100. In the PDA 100, a casing for a data processing terminal is provided with a display panel 110 mounted on the front surface thereof. The display panel 110 includes a liquid crystal display panel to show various types of characters and graphics, for example. Operation keys 101 are provided at a lower end of the front surface of the PDA 100.

A back-surface touch sensor 120 is disposed inside the casing for detecting a touch on the back surface of the casing. The display area of the display panel 110 is substantially equal to the touch detection area of the back-surface touch sensor 120 so that the back-surface touch sensor 120 can detect a touch on substantially the entire area directly below the display area of the display panel 110. The back-surface touch sensor 120 can detect a touch by a living body such as a finger as well as the position being touched (hereinafter, referred to as "touch position"). The actual construction of the back-surface touch sensor 120 will be described below.

Figure 2:
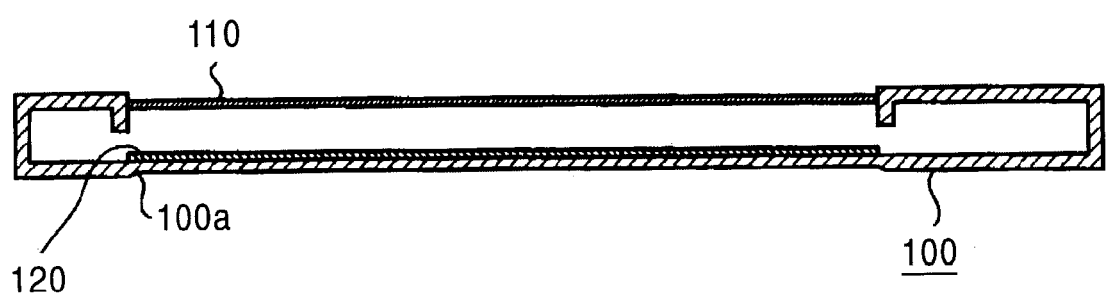
FIG. 2 is a cross-sectional view showing an example internal layout of the apparatus according to one embodiment of the present invention.

FIG. 2 shows a cross-sectional view of an example layout of the display panel 110 and the back-surface touch sensor 120. The display panel 110, which has a relatively large display area, is provided on the front surface of the PDA 100. Directly below the display panel 110 inside the casing is the back-surface touch sensor 120 that includes a substrate provided with touch-sensitive electrodes attached to a part of the casing. A slight concave 100a is provided at the position of the casing where the substrate including the back-surface touch sensor 120 is disposed, so that the position of the back-surface touch sensor 120 can be noticed by tactile sensation. In FIG. 2, for simplicity, only the physical relationship between the display panel 100 and the back-surface touch sensor 120 is shown, and the layout of the other components of the PDA 100 is omitted.

Figure 3:
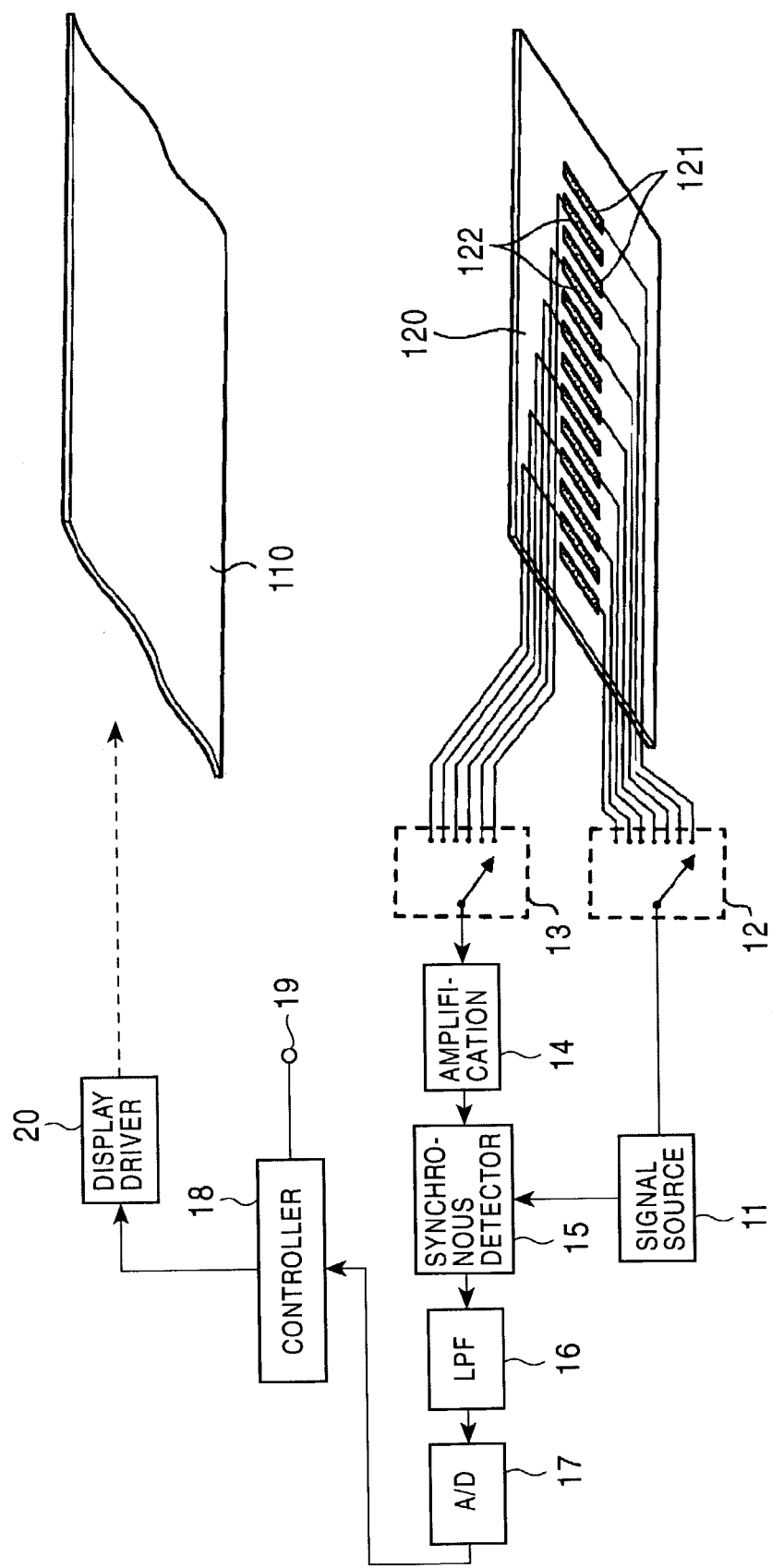
FIG. 3 is an illustration showing an example diagram of a sensor according to one embodiment of the present invention.

FIG. 3 shows an example construction of the back-surface touch sensor 120. The substrate having the back-surface touch sensor 120 formed thereon is disposed directly below the display panel 110. On the surface of the substrate, a first group of a plurality of electrodes 121 (hereinafter, referred to as "the first group 121") and a second group of a plurality of electrodes 122 (hereinafter, referred to as "the second group 122") are alternately disposed at predetermined intervals in a linear manner. The first group 121 serves as transmission electrodes while the second group 122 serve as reception electrodes. In FIG. 3, for simplicity, the electrodes of the first group 121 and the second group 122 are aligned in only one line. However, when the back-surface touch sensor 120 is required to have a large touch detection area, a plurality of electrode rows must be provided. For example, when it is necessary to detect a touch on substantially the entire area of the display panel 110, the area of the substrate having the back-surface touch sensor 120 must be substantially equal to that of the display panel 110, and the electrodes of the first group 121 and the second group 122 must be disposed in a predetermined pattern over substantially the entire area of the overlapping part between the substrate and the display area of the display panel 110.

When a finger touches the concave 100a on the back surface of the PDA 100, the capacitance between adjacent electrodes of the first group 121 and the second group 122 varies due to capacitive coupling between the finger touching the concave 100a and the adjacent electrodes of the first group 121 and the second group 122. A variation in the capacitance is electrically measured to detect a touch and the touch position is also found. The detection process is described below. In addition, when the finger approaches the casing, the position of the finger can also be found based on a measurement of the variation in capacitance. As used herein, "approach" means a state in which the finger approaches the vicinity of the casing within, for example, several millimeters from the back surface of the casing.

A particular signal output from a signal source 11 is supplied to the first group 121 in the time-sharing manner via a selector switch 12. The selector switch 12 permits sequential signal supply to each electrode of the first group 121 from the signal source 11 at predetermined short intervals in a time-sharing manner. A selector switch 13 switches in synchronization with the selector switch 12 to permit sequential signal supply from each electrode of the second group 122 to an amplifier 14 in a time-sharing manner. The selector switches 12 and 13 switch over with the same period. For example, when the selector switch 12 switches so that a signal produced from the signal source 11 is fed into an electrode of the first group 121, the selector switch 13 switches to select one electrode of the second group 122, which electrode is adjacent to the selected one of the first group 121, and allows a signal from the selected electrode of the second group 122 to be fed into the amplifier 14.

The signal source 11 produces a predetermined signal, such as an alternating current signal having a specific frequency. The signal produced from the signal source 11 is sequentially fed via the selector switch 12 to each electrode of the first group 121. An electrode of the first group 121 (transmission electrode) sends a signal to the corresponding electrode of the second group 122 (reception electrode). The signal is fed into the amplifier 14 where it is amplified and then fed into the synchronous detector 15. In the synchronous detector 15, a signal component contained in the signal from the amplifier 14 synchronized with the frequency of an output signal from the signal source 11 is detected. The detected signal component is fed into a low-pass filter 16 to be converted into a direct current signal. This direct current signal is fed into an analog-to-digital converter 17 where the signal strength of the direct current signal is converted into binary data.

The data produced at the analog-to-digital converter 17 is fed into a controller 18 that controls input/output devices. The controller 18 determines, based on the fed data, the operation state of the back-surface touch sensor 120 to issue a corresponding command from a terminal 19. In the present embodiment, the controller 18 determines, based on the data supplied via the analog-to-digital converter 17, the variation in the signal strength which indicates whether the finger touches or the finger approaches the back-surface touch sensor 120 disposed on the back surface of the casing.

In addition, the controller 18 produces a display control signal to control characters and graphics shown on the display panel 110, which is driven by a display driver 20. For example, when the controller 18 determines a touch on or an approach to the back-surface touch sensor 120, the controller 18 causes the display panel 110 to show a mark representing a "touch" mark or an "approach" mark directly above the determined back-surface sensor 120. The marks representing respective "touch" and "approach" may be displayed in a distinguishable manner, such as by using different colors for the respective marks.

Figure 4A:
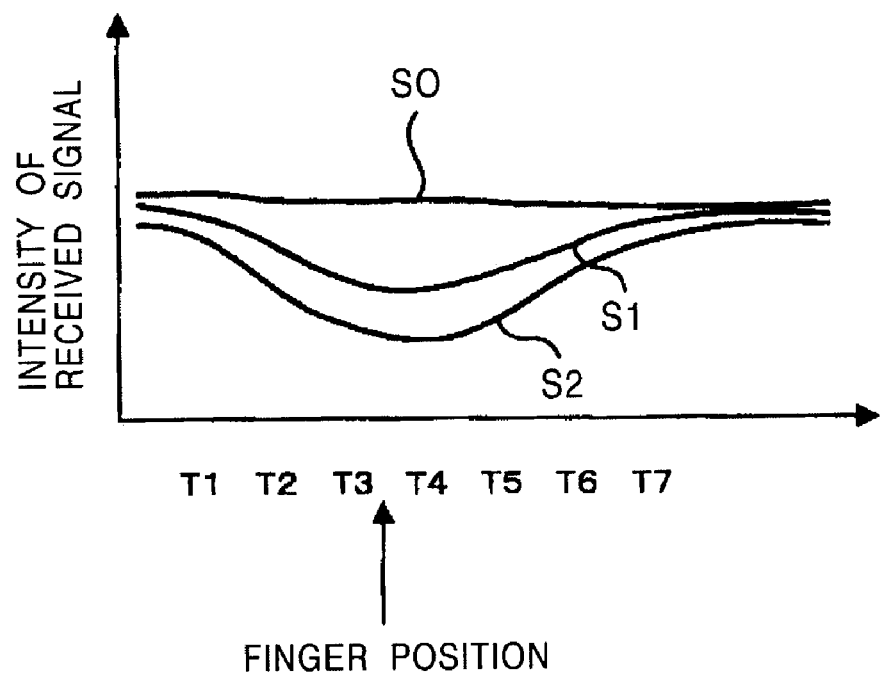
FIGS. 4A and 4B are graphs showing detection characteristics of one embodiment of the present invention.
Figure 4B:
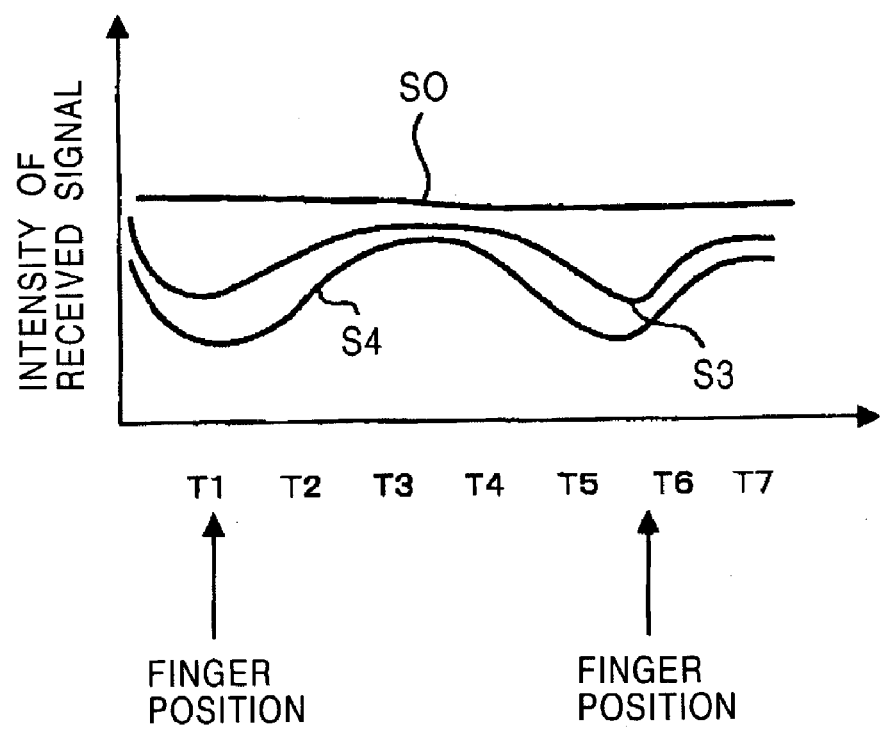

Next, there will be described with reference to FIGS. 4A and 4B how the input device of the present invention can detect a touch or an approach of the finger. FIG. 4A shows a state in which one finger touches a particular part of the casing directly below a part provided with the electrodes of the first group 121 and the second group 122. Positions T1, T2, T3, T4, . . . represent touch positions. In FIG. 4A, the finger touches substantially the central position between the positions T3 and T4. When this position is thus touched, the intensity of a signal that is detected by the synchronous detector 15 via the electrode corresponding to the angle and position of a touch is less than those of the signals detected via the other electrodes.

For example, it is assumed that the positions T1, T2, T3, T4 . . . correspond to the position of each electrode of the first group 121 disposed at predetermined intervals. When a signal is fed from the signal source 11 to one electrode of the first group 121 at the position T1, a signal from an electrode of the second group 122 that is adjacent to the electrode of the first group 121 at the position T1 is fed into the synchronous detector 15 where it is demodulated. The received signal intensity of the demodulated signal is the intensity of the signal at the position T1. The intensity of the signal is measured over the region where all electrodes of the first group 121 and the second group 122 are disposed, and the controller 18 finds the signal intensity between adjacent electrodes of the first group 121 and the second group 122 using interpolation. Thus, a signal intensity having a normal signal-reception intensity characteristic S0 (shown in FIG. 4A) indicating substantially uniform signal intensity over the region can be obtained when the finger or the like is not in the proximity of the concave 100a of the casing.

On the other hand, when the finger approaches substantially a central position between, for example, the positions T3 and T4, the signal reception intensity of the position being approached by the finger (hereinafter, referred to as "approach position") is lower than those of the other positions in the region, giving a characteristic S1 shown in FIG. 4A. When the approaching finger touches the front surface of the display panel 101, the signal reception intensity of the touch position decreases further than those of the other positions in the region, giving a characteristic S2 shown in FIG. 4A.

A decrease in the signal reception intensity at the touch position occurs due to capacitive coupling between the finger and the corresponding electrodes of the first group 121 and second group 122, giving the largest decrease at the touch position. The controller 18 determines the decrease in the signal reception intensity to compute the touch position the approach position. In order to be able to distinguish between a touch on the display panel 101 and the approach to the display panel 101, the controller 18 also determines a level difference between the signal reception intensity S1 obtained when the finger approaches the display panel 101 and the signal reception intensity S2 obtained when the finger touches the display panel 101.

Even when several positions on the display panel 110 are touched or approached, the touch detection can be achieved using the construction shown in FIG. 3. For example, one finger approaching the position T1 and another finger approaching the position T6 produce a received signal intensity having a characteristic S3 shown in FIG. 4B. The characteristic S3 has two peaks of received signal intensity that decrease in the respective proximities of Ti and T6 compared to the substantially flat characteristic S0. When these two fingers touch the respective positions, the received signal intensity characteristic S4 is reduced further. The controller 18 therefore computes the positions of the peaks to find the positions being touched or approached by the two fingers. The same method can be applied even when at least three positions are simultaneously approached or touched.

Figure 5:
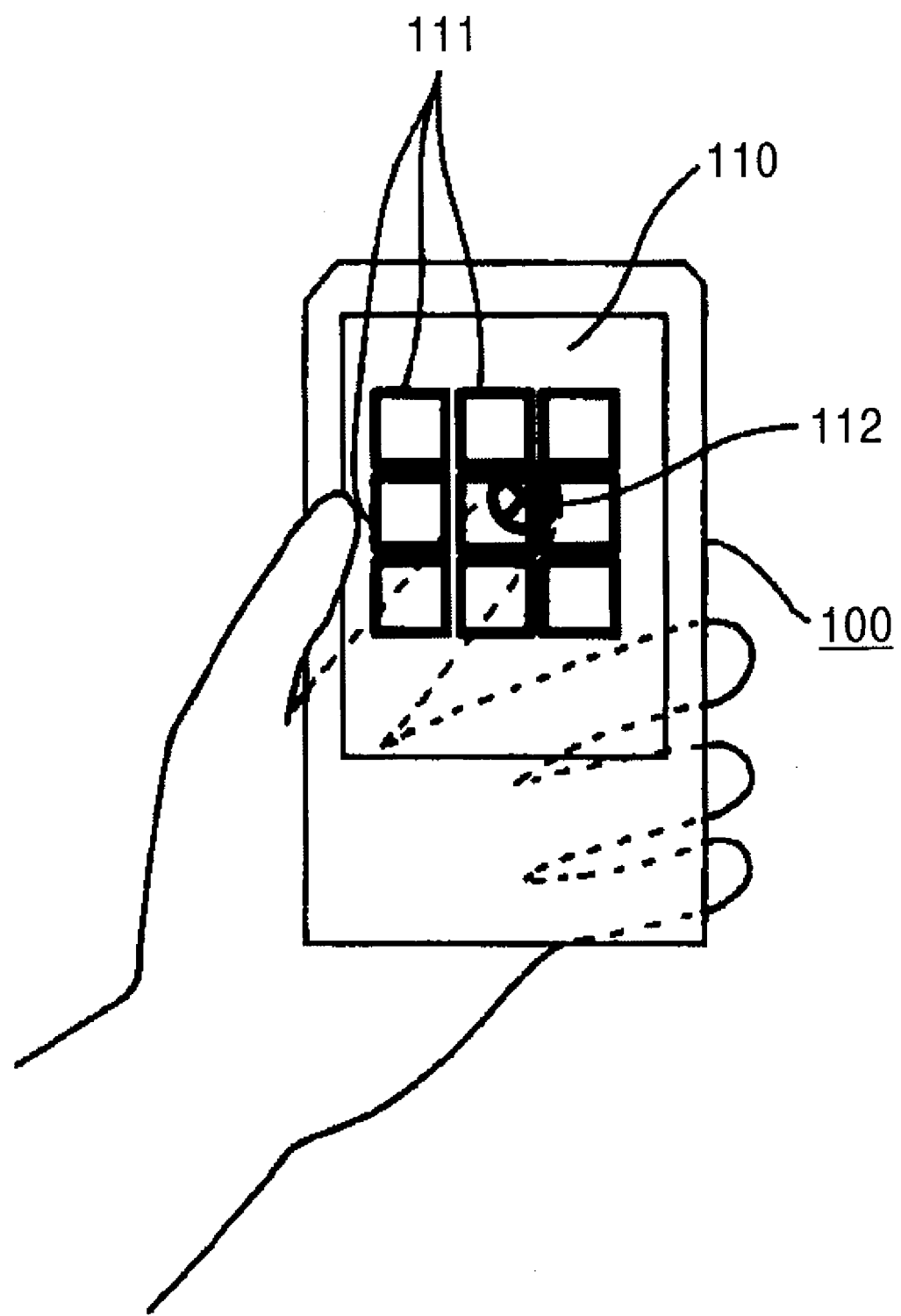
FIG. 5 is an illustration showing an example single-handed operation of the device according to one embodiment of the present invention.

The PDA 100 including the back-surface touch sensor 120 for detecting the approach or touch of fingers is operated shown in, for example, FIG. 5. A user holds the PDA 100 single-handed so as to face the front surface of the display panel 110. At least one finger of a hand holding the PDA 100 places on the back surface of the PDA 100 to touch the concave 100a of the display panel 100 with the finger.

Touching in this manner causes the controller 18 to determine the touch position via a circuit connected to the electrodes disposed in the back-surface touch sensor 120. A display panel 110 displays, for example, a plurality of operation buttons 111 (hereinafter, referred to as "the operation buttons 111"). In addition, a touch position pointer 112, such as a cross-shape pointer, is displayed on the position of the display panel 110 that corresponds to the touch position that is determined by the controller 18. The touch position pointer 112 may take any other shape as long as the center thereof can be recognized. The operation buttons 111 are displayed so that as shown in FIG. 1, a function assigned to each button can be recognized with characters or graphics. The approach position may be also displayed in the same manner as the touch position displayed.

When the touch position pointer 112 and one of the operation buttons 111 are overlapped, the controller 18 determines that the button at the overlapped position is operated, and the controller 18 issues the operation command corresponding to the button at the overlapped position from the terminal 19. When the operation command can be processed, the controller 18 executes the operation command.

Figure 6:
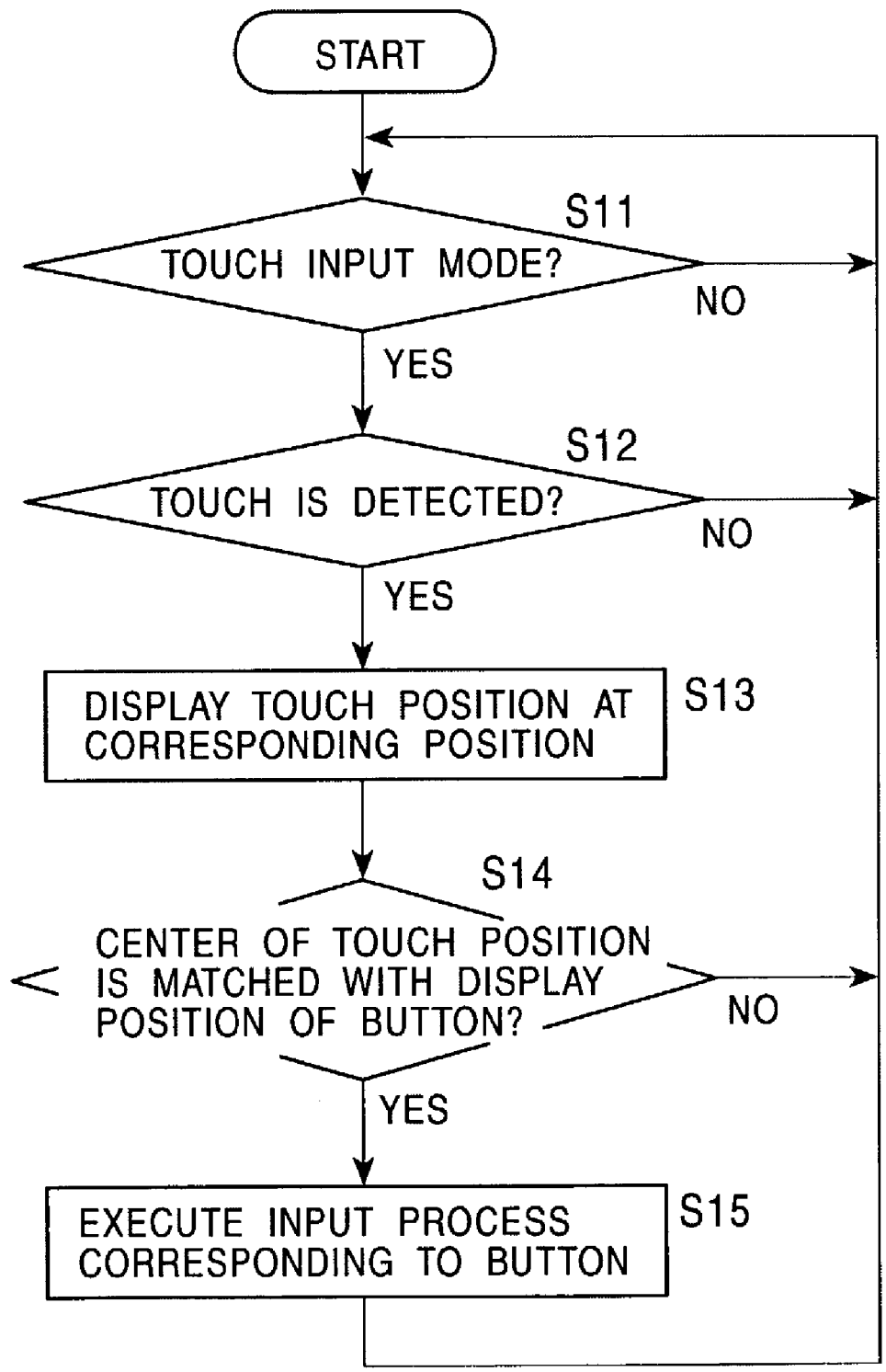
FIG. 6 is a flowchart showing an example input process of one embodiment of the present invention.

Next, a process executed by the controller 18 in response to detection of a touch and an approach will be described with reference to the flowchart in FIG. 6. Initially, the controller 18 determines whether a touch input mode is set as an operation mode (step S11). When the controller 18 determines that the touch mode is set (this indicates that, for example, the operation buttons 111 or the like are displayed), the controller 18 determines whether the back-surface touch sensor 120 detects a touch (step S12).

When the determination at step S12 is affirmative, the controller 18 causes the touch position pointer 112 to be displayed at the corresponding position directly above the detected touch position in the display panel 110 (step S13).

The controller 18 determines whether the center of the touch position pointer 112 is overlapped with one of the operation buttons 111 (step S14). When the determination at step S14 is affirmative, the controller 18 determines that one of the operation buttons 111 corresponding to the overlapped position is pressed and then executes the input process corresponding to the pressed button (step S15).

When the determination at S11 is negative, when a touch is not detected at step S12, when the center of the touch position is not overlapped with the display area of any of the operation buttons 111, and when the step S15 is executed, the process proceeds back to step S11.

Since the input process using the touch input is performed in accordance with the determinations of the controller 18, although a touch on the front surface of the display panel 110 is not required, the input process can be achieved in the same manner as known touch panels. In this case, since the finger or the like touches the back surface of the device, the user can operate with recognizing characters and graphics displayed on the display panel 110 and without hiding them with the finger, thus improving the operability of the display panel 110. In addition, the touch position on the back surface of the device can be confirmed with the touch position pointer 112. Therefore, although a touch occurs on the back surface, since the correspondence between the touch position pointer 112 on the front surface and the touch position on the back surface can be easily recognized, the disposition of the sensor on the back surface does not deteriorate the operability.

Figure 7A:
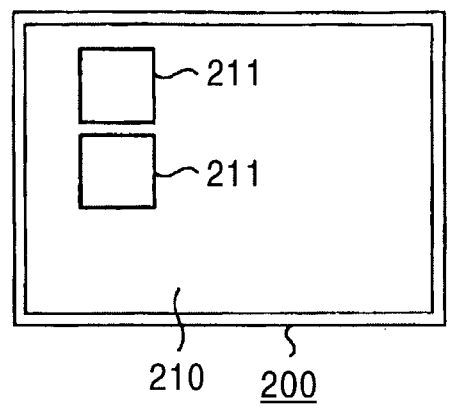
FIGS. 7A, 7B, and 7C are illustrations showing other example operations of the device according to another embodiment of the present invention.
Figure 7B:
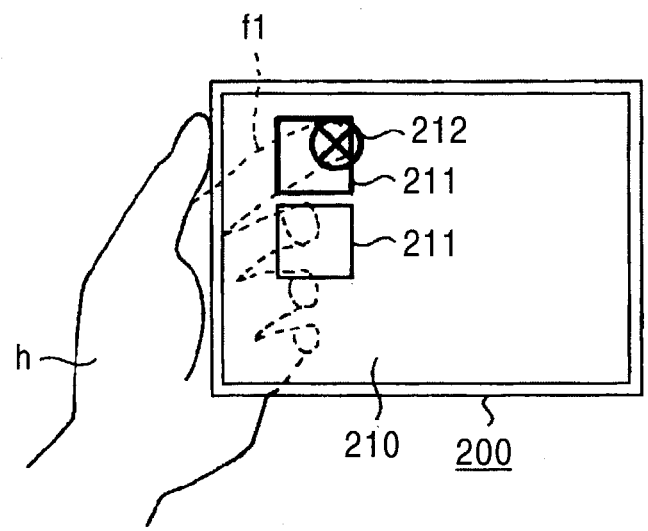

Although the PDA 100 is operated single-handed in the operation example in FIG. 5, the PDA 100 may be operated with both hands. As shown in FIG. 7A, a data processing terminal 200 is provided with a relatively large display panel 210 on the front surface. In the data processing terminal 200, touching the back surface of the data processing terminal 200 can be detected by the back-surface touch sensor 120, and a plurality of operation buttons 211 (hereinafter, referred to as "operation buttons 211") are displayed on the display panel 210.

When one finger f1 of one hand h touches at a position on the back surface corresponding to one of the operation buttons 211, a touch is detected, causing a touch position pointer 212 to display on the corresponding position of the display panel 210. When the center of the touch position pointer 212 is overlapped with one of the operation buttons 211, a function corresponding to the touched button of the operation buttons 211 is executed.

Figure 7C:
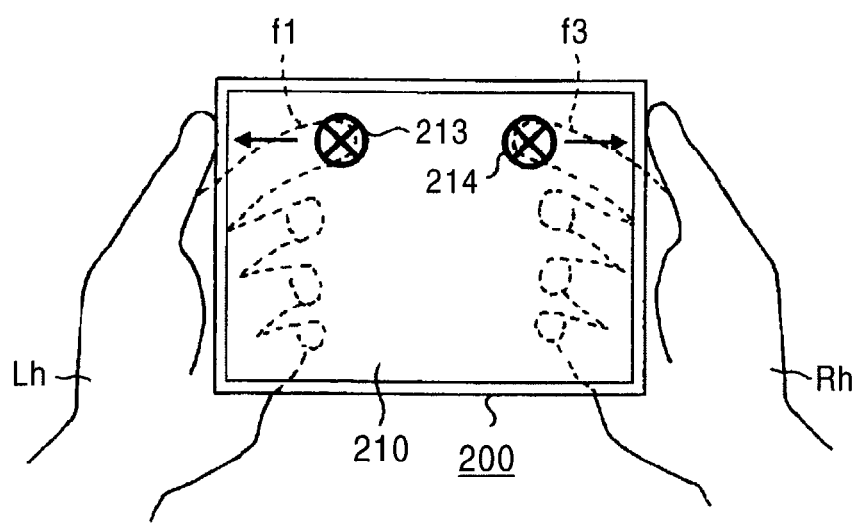

The back-surface touch sensor of the data processing terminal 200 can detect a plurality of positions simultaneously. As shown in FIG. 7C, touch position pointers 213 and 214 corresponding-to the respective touch positions of a finger f2 of a left hand Lh and a finger f3 of a right hand Rh on the back surface may be displayed with the data processing terminal 200 held with a left hand Lh and a right hand Rh. When a plurality of positions is touched simultaneously, a particular input operation may be performed on the data processing terminal 200 so that the two touch positions move apart in the respective arrow directions in FIG. 7C (or the reverse operation). For example, when the data processing terminal 200 is operated so that the two touch positions are moved apart, characters and graphics displayed may be enlarged; and when operated so that the two touch positions are moved closer, the characters and graphics may be reduced.

Figure 8:
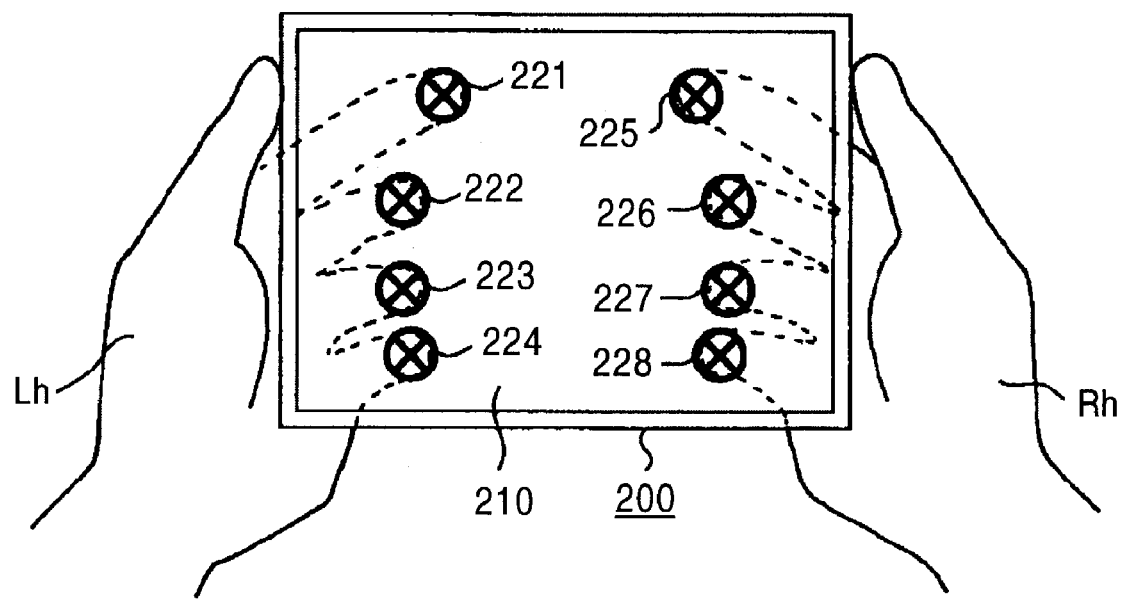
FIG. 8 is an illustration showing another example operation of the device according to another embodiment of the present invention.

Furthermore, for example, as shown in FIG. 8, when four fingers of the left hand Lh touch the back surface of the data processing terminal 200, the respective touch position pointers 221, 222, 223, and 224 may be displayed on the display panel 210; and when four fingers of the right hand Rh touch the back surface of the data processing terminal 200, the respective touch position pointers 225, 226, 227, and 228 may be displayed on the display panel 210. When some of these touch position pointers 221 to 228 are overlapped with the respective operation buttons and the like, the input corresponding to each of the overlapped operation buttons is performed and another input process can be preformed based on a relationship among a plurality of touch positions.

The PDA 100 is exemplified as an apparatus provided with the input device according to the present embodiment. However, in place of the PDA 100, the input device may be applied to various types of electronic apparatuses.

In the present embodiment, although being able to detect both a touch and an approach, the touch sensor can detect only a touch. Alternatively, when the finger is within several millimeters from the back surface of the casing, the back-surface touch sensor 120 may detect this state as the contact.

In the circuit of the input device shown in FIG. 3, the signal is applied to each electrode in the time-sharing manner and the signal transmitting through each electrode is detected in the time-sharing manner. The input device may be constructed so that the signal transmitting through each electrode can be detected using another construction or procedure.

The input device detects a touch or an approach of the living body (or the finger) to a predetermined range of the display panel to perform an input process. However, the input process may be performed based on the detection of a touch or an approach of an input pen or the like in place of the living body.

Figure 9:
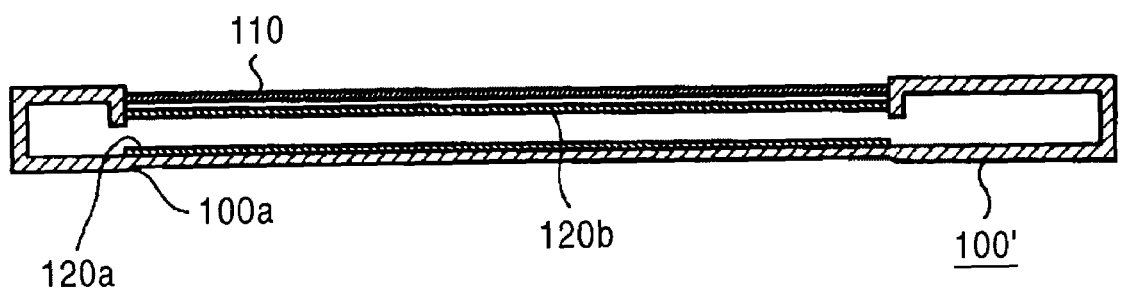
FIG. 9 is a cross-sectional view of an example construction of the device according to still another embodiment of the present invention.

In addition, the detection occurs only on the back surface of the display panel. However, touch sensors may be provided to the front surface as well as well as the back surface of the display panel so that a touch and an approach can be detected on both surfaces of the input device. For example, as shown in FIG. 9, a PDA 100' includes a back-surface touch sensor 120*a* provided on the back surface of the casing and a front-surface touch sensor 120*b* directly below the display panel 110 for detecting a touch of the finger or the like on the back surface and the front surface of the display panel 110.

When the back-surface touch sensor 120a and the front-surface touch sensor 120b are separately provided, the same type of operation input may be applied to the touch sensors 120a and 120b on the respective surfaces. However, different type of operation inputs may be applied to the touch sensors 120a and 120b.

Figure 10:
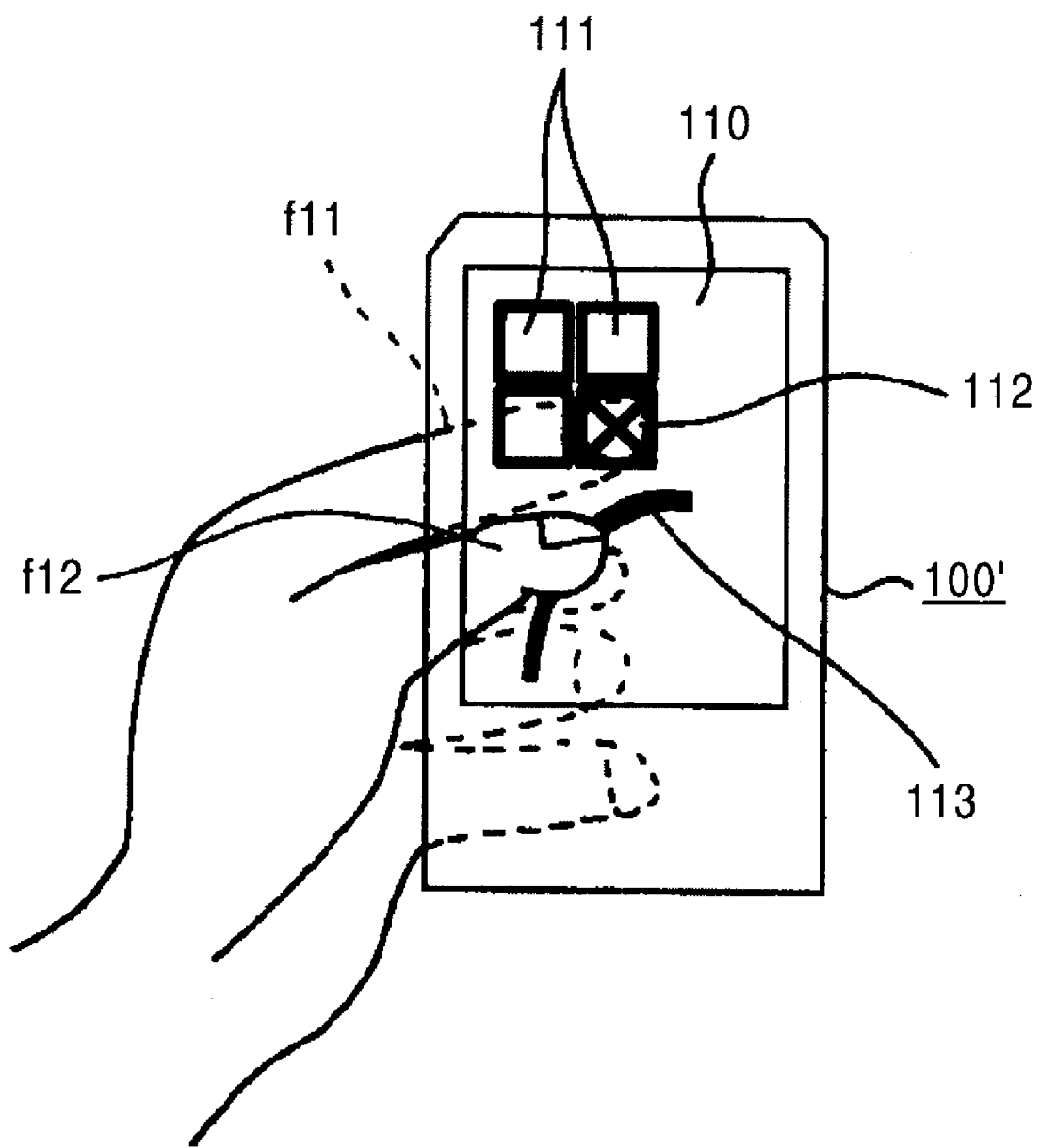
FIG. 10 is an illustration showing an example operation of the device shown in FIG. 9.

For example, as shown in FIG. 10, the operation buttons 111 are displayed on the front surface of the display panel 110 disposed on the PDA 100'. One of the operation buttons 111 is selected with a touch of the finger f11 on the back surface detected by the back-surface touch sensor 120a. Here, an adjusting item selection is performed using the operation buttons 111. The mark representing the touch position is displayed on the display panel 110.

Below the display panel 110 is provided a level-adjusting pointer 113 disposed as a curve on the front surface of the display panel 110. The level-adjusting pointer detects the position of a touch of the finger f12 on the curve using the front-surface touch sensor 120b and sets the detected touch position as the adjustment value.

An adjustment item can be selected in accordance with a touch position on the back surface of the device, and a value corresponding to the selected adjustment item can be set in accordance with a touch position on the front surface of the device. This realizes an advanced single-handed input operation shown in FIG. 10.

Figure 11:
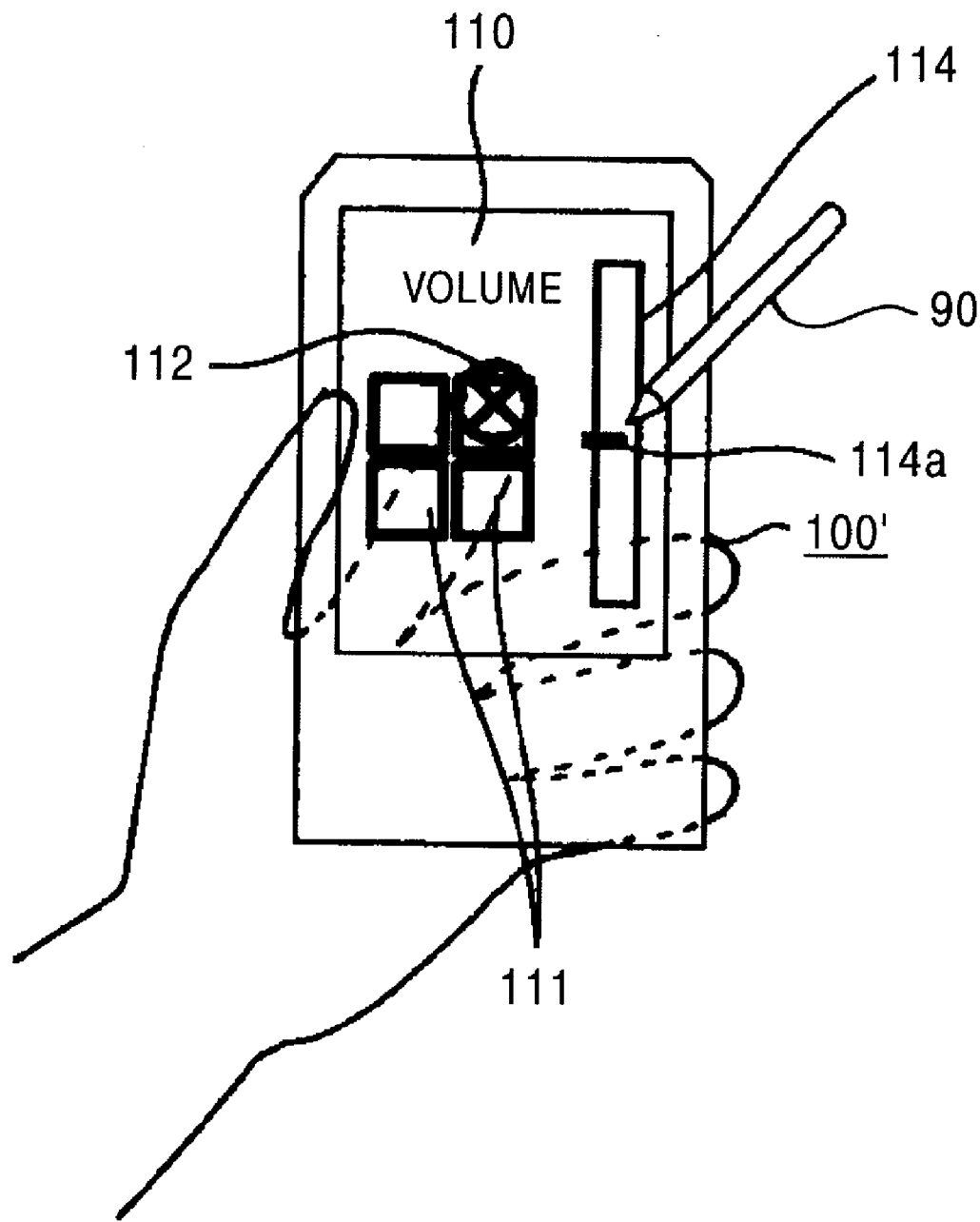
FIG. 11 is an illustration showing another example operation of the device shown in FIG. 9.

Although the fingers directly touch both of the front-surface and the back surface of the device in the example shown in FIG. 10, a device, such as the input pen, may be applied to either of the surfaces. As shown in FIG. 11, for example, the back-surface touch sensor 120a may detect a direct touch of the finger on the back surface of the device (or an approach of the finger) and the front-surface touch sensor 120b may detect a touch position of an input pen 90 on the front surface (or an approach position). In this case as well, an adjustment item may be selected in accordance with the position of a touch of the finger on the back surface, and a value corresponding to the selected adjustment item may be set in accordance with the position of a touch of the input pen on the front surface.

In the example shown in FIG. 11, the touch position pointer 112 is controlled so that the center of the touch position pointer 112 is overlapped with a volume-control button of the operation buttons 111 to adjust the volume. A level-adjusting pointer 114 is displayed on the display panel 110 in a bar graph manner in which an adjustment point 114a is varied in accordance with the touch position of the input pen 90 on the front surface of the display panel 110 to adjust the volume. Thus, a combination of a touch of the finger on the back surface and a touch of the input pen on the front surface realizes an advanced input operation.

In these described examples, only the input process related to display is performed based on the touch position on the back surface (or the front surface) of the device. An actuator (for example, a piezoelectric element), which temporarily vibrates the device in response to pulse signals applied to the PDA 100, may be provided in the PDA 100. When a touch or an approach of the finger is detected, the actuator may be caused to temporarily vibrate the device to transmit vibrations to the user holding the device so that the feel of clicking is obtained when the back surface (or the front surface) of the device is touched. Alternatively, when the center of the touch position is overlapped with the display position of one of the operation buttons 111 to execute an input process, the actuator may be caused to temporarily vibrate the device so that the feel of clicking is obtained. This enables the user to easily recognize operation states and also improves the operability with aid of the display of the touch position on the display panel and the feel of clicking due to the vibrations.

The above-described constructions for detecting a touch and an approach are given only as examples; other constructions may be applied.

What is claimed is:

1. An input method comprising:
   an operation-input display step of displaying information related to an operation input at a display position on a first surface;
   a detecting step of detecting a touch of a first object at a first touch position on the first surface, wherein the first touch position on the first surface sets an adjustment value;
   a detecting step of detecting a touch of a second object at a second touch position on a second surface behind the first surface;
   a touch-position display step of displaying a mark at a mark position directly above the second touch position, the mark representing the second touch position;
   an input step of determining whether the display position of the information displayed at the operation-input display step and the mark position of the mark displayed at the touch-position display step are overlapped; and
   an executing step of executing an input process corresponding to the overlapped information and the adjustment value;
   wherein the first touch position and the second touch position are offset in a direction parallel to the first surface.

2. An input method according to claim 1, wherein:
   the detecting step detects an approach of the second object to an approach position on the second surface behind the information displayed at the operation-input display step; and
   the touch-position display step displays a mark representing the approach position.

3. An input method according to claim 1, further comprising a vibrating step causing temporary vibration in accordance with a state of the touch detection at the detecting step.

4. An input device comprising:
   a display panel disposed on a front surface of a casing;
   a front-surface sensor for detecting a touch of a first object at a first touch position on the front surface of the casing;
   a back-surface sensor for detecting a touch of a second object at a second touch position on a back surface behind the front surface of the casing; and
   a control means for:
   displaying information related to an operation input on the display panel on the front surface,
   displaying a mark representing the second touch position at a mark position directly above the second touch position detected by the back-surface sensor,
   determining whether the display position of the information related to the operation input and a position of the mark are overlapped, determining an adjustment value based on the first touch position on the front surface;

executing an input process corresponding to the overlapped information and the adjustment value;

wherein the first touch position and the second touch position are offset in a direction parallel to the first surface.

5. An input device according to claim 4, wherein:

the back-surface sensor detects an approach of the second object to an approach position on the back surface of the casing; and the control means displays a mark representing the approach position detected by the back-surface sensor on the corresponding display panel position.

6. An input device according to claim 4, further comprising an actuator for temporarily vibrating the casing provided with the display panel, wherein the control means controls vibrations of the actuator in accordance with a touch-detection state obtained by the back-surface sensor.

* * * * *